Feb. 17, 1959  H. L. BARTHOLOMEW  2,873,988
ROD AND FIXTURE CONNECTOR
Filed March 6, 1957

INVENTOR.
Harvey L. Bartholomew.
BY
Fishburn and Gold,
ATTORNEYS.

United States Patent Office 2,873,988
Patented Feb. 17, 1959

2,873,988

ROD AND FIXTURE CONNECTOR

Harvey L. Bartholomew, Kansas City, Mo.

Application March 6, 1957, Serial No. 644,276

2 Claims. (Cl. 287—126)

This invention relates to fastening devices for connecting rods to fixtures or mounting fixtures on rods, and more particularly to a new and improved fastening means for attaching rods and like elongate members to eye members and like fixtures.

The objects of the present invention are to provide a novel fixture connector having a split socket member for receiving a rod end and resiliently gripping same with spaced serrations in the socket member for holding engagement with the rod end; to provide such a fixture connector with a plurality of spaced inwardly extending projections or serrations inclined inwardly away from the socket opening in which a rod is inserted whereby the engagement of the projections or serrations with the rod resists removal of the rod from the socket; to provide such a fixture connector wherein the projections or serrations are relatively hard and tend to bite deeper into a relatively softer rod in response to forces applied to the connector and rod tending to separate same; and to provide a rod and fixture connector that is economical to manufacture and easily assembled to make a tight connection.

In accomplishing these and other objects of the present invention, I have provided improved details of structure, the preferred form of which is illustrated in the accompanying drawings, wherein.

Figure 1:
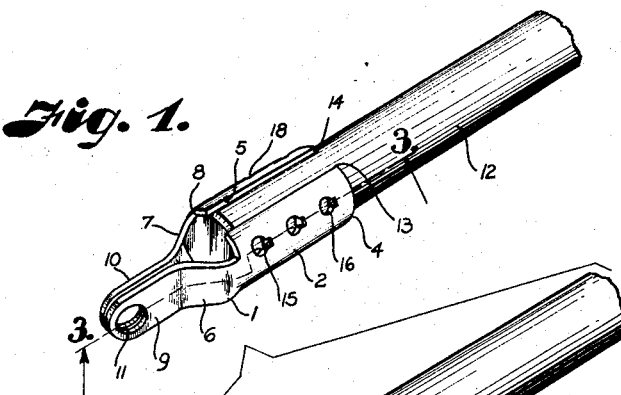
Fig. 1 is a perspective view of a rod and fixture embodying the features of the present invention.

Referring more in detail to the drawings:

1 designates a fixture such as an eye member cut and formed from suitable metal such as sheet steel to form a socket member 2 having a longitudinally extending socket 3 therein opening from the end 4 thereof. The socket member 2 is in the form of a substantially cylindrical sleeve having a longitudinally extending slot 5 whereby the sleeve will be enlarged when applied over a member larger in cross section than the normal socket 3. The fixture 1 is preferably formed of a steel that when completed will have spring qualities to provide a gripping action, as later described.

In the structure illustrated, the fixture 1 has oppositely disposed arms 6 and 7 integral or otherwise fixed on the socket member 2 at the end 8 of the sleeve opposite the open end 4 thereof. The arms 6 and 7 are inclined inwardly and terminate in ears 9 and 10 having aligned apertures 11 therethrough to form an eye member. It is to be understood that the eye member is exemplary only as the fixture 1 may be a knob, clevis or other member having a split sleeve adapted to be mounted on an elongated member such as a rod 12 which is preferably of softer material than the socket member.

Figure 2:
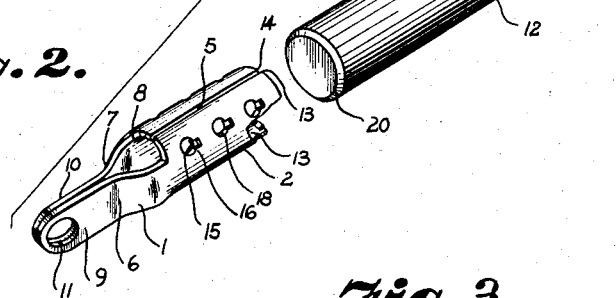
Fig. 2 is a perspective view of the rod and fixture in disassembled spaced relation.
Figure 3:
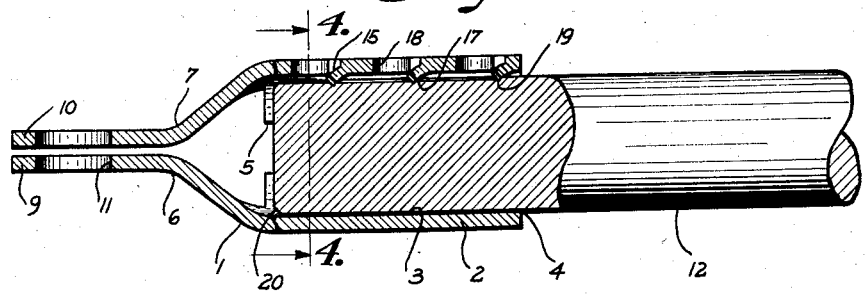
Fig. 3 is a longitudinal sectional view through the rod and fixture on the line 3—3, Fig. 1.
Figure 4:
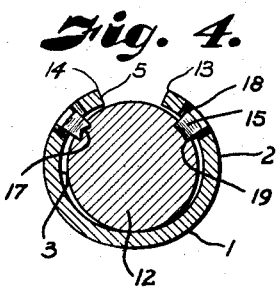
Fig. 4 is a transverse sectional view through the rod and fixture on the line 4—4, Fig. 3.
Figure 5:
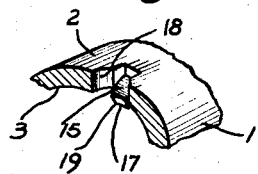
Fig. 5 is an enlarged partial perspective view of the socket member particularly illustrating the serration therein.

The socket member 2 is preferably formed whereby the edges 13 and 14 defining the slot 5 are closely spaced prior to assembly on a rod 12 as illustrated in Fig. 2. It is also preferable that the cross section of the socket 3 be ovate with the long diameter extending from the slot 5, whereby some spreading of the edges 13 and 14 will cause the socket 3 to be more nearly cylindrical. The socket member is provided with a plurality of spaced lugs or serrations 15 extending inwardly into the socket from the side walls thereof. The lugs 15 are preferably integral with the walls of the socket member and arranged in rows 16 longitudinally of the socket with a plurality of spaced lugs or serrations 15 in each row 16 and a plurality of rows 16 spaced circumferentially of the interior of the socket 3. In the illustrated structure, there are two rows of lugs or serrations substantially spaced from the edges 13 and 14 and there are three lugs in each row. Each of the lugs or serrations slope or are inclined inwardly and away from the open end 4 of the socket and terminate in an inwardly directed relatively sharp edge 17 adapted to engage and bite into the rod 12. In the illustrated structure, the walls of the socket member are provided with a plurality of spaced cylindrical openings 18, and at the sides of said openings toward the open end 4 a portion of the wall is punched downwardly to form the inclined serrations 15. With this structure, the inner ends of the lugs or serrations 15 are arcuate providing teeth 19 at the side edges of the inner ends of said serrations to increase the tendency of the serrations to penetrate into the rod 12.

The fixture illustrated is preferably formed by stamping or otherwise cutting the blank from a flat sheet of suitable steel or the like, then punching the holes 18 therein, and then bending the arm 6 to the desired shape. The fixture is then formed to provide the sleeve-like socket member and the holes 11 punched. Then the serrations are pressed in the walls of the socket member and the socket member heat treated whereby it forms a very strong cylindrical spring-like material with the inner ends of said lugs or serrations relatively hard whereby the edges 17 and teeth 19 form cutting edges capable of penetrating softer metal or other material such as the rod 12 adapted to be inserted in the socket.

In assembling the fixture 1 on a rod 12 of softer material than the socket member and serrations thereon, the rod 12 which preferably has the end slightly beveled as at 20 is suitably supported in a vise or the like. Then the fixture is arranged with the socket 3 therein aligned with the rod and the open end 4 engaged with said rod. The fixture is then driven on the rod which is larger than the diameter of the socket 3 whereby the slot 5 is spread and the sleeve-like socket member grips the rod through the resiliency of said sleeve-like socket member. As the socket member is driven onto the rod, the ends of the serrations or lugs may cut small grooves in the rod; however, due to the inclination of the serrations, they tend to ride up rather than cut grooves. After the rod is in place in the socket, the resiliency of the sleeve tends to cause the cutting edges of the serrations to bite or penetrate into the rod to hold the fixture on the rod. If forces are applied to the fixture and the rod tending to pull them apart, the inclination of the serrations is such that the teeth thereon tend to penetrate deeper into the rod and resist separation of the rod and fixture. In the structure illustrated, the serrations cooperate with the engagement of the rod with the interior of the socket member opposite the slot 5 to provide a firm gripping and inter-engagement of the serrations with the rod to form a firm anchorage of the fixture on the rod.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A fixture connector for use on a relatively soft rod end portion substantially circular in cross section including a fixture having a sleeve-like socket member thereon with the side walls defining a socket of slightly ovate cross section and of less diameter than a rod end portion adapted to be secured therein, said socket being open at one end for receiving said rod end portion, said socket member being of heat-treated spring metal and having a slot extending substantially longitudinally and for the full length thereof whereby when said rod end portion is inserted in the socket the side walls thereof are spread and said slot widened to enlarge the socket into a substantially cylindrical cross section wherein said side walls have gripping engagement with said rod end portion, and a plurality of rigid lugs integral with the socket side walls on opposite sides and adjacent to said slot, said lugs each having an inner end of arcuate concave form, said lugs extending inwardly in the socket and being inclined inwardly and away from said open end of the socket and terminating in tooth-like edges, said lugs being relatively hard whereby during movement of the rod end portion into the socket the lugs ride over said rod end portion further expanding said socket member and upon stopping of said movement the resiliency of the socket member effects penetration of the tooth-like edges on the lugs into said rod end portion whereby force applied to the fixture and rod end tending to separate same increases the penetration to retain the fixture on the rod.

2. A fixture connector for use on a relatively soft rod end portion substantially cylindrical in cross section including, a fixture having an elongate sleeve-like socket member thereon with the side walls defining an elongate socket of slightly ovate cross section and of less diameter than a rod end portion adapted to be secured therein, said socket being open at one end for receiving said rod end portion, said socket member being of heat-treated spring metal and having a slot extending longitudinally and for the full length thereof whereby when said rod end portion is inserted in the socket the side walls thereof are spread and said slot widened to enlarge the socket into a substantially cylindrical cross section wherein said side walls have gripping engagement with said rod end portion, said sleeve-like socket member having a plurality of apertures in the socket side walls and arranged in a plurality of rows extending longitudinally adjacent to the slot and spaced circumferentially therefrom, a rigid lug formed in said socket side walls at each aperture, said lugs each having an inner end of arcuate concave form, said lugs extending inwardly in the socket and being inclined inwardly and away from said open end of the socket and terminating in tooth-like edges, said lugs being relatively hard whereby during movement of the rod end portion into the socket the lugs ride over said rod end portion further expanding said socket member and upon stopping of said movement the resiliency of the socket member effects penetration of the tooth-like edges on the lugs into said softer rod end portion whereby force applied to the fixture and rod end tending to separate same increases the penetration to retain the fixture on the rod.

References Cited in the file of this patent

UNITED STATES PATENTS

| | | |
|---|---|---|
| 483,128 | Beilman et al. | Sept. 27, 1892 |
| 843,507 | Villalaz | Feb. 5, 1907 |
| 1,568,585 | Brune | Jan. 5, 1926 |
| 1,734,503 | Smith | Nov. 5, 1929 |
| 1,974,027 | Knick | Sept. 18, 1934 |
| 2,752,179 | Le Febvre | June 26, 1956 |